(12) United States Patent  (10) Patent No.: US 7,484,761 B2
Plavetich et al.  (45) Date of Patent: Feb. 3, 2009

(54) VEHICLE BACKBONE

(75) Inventors: Richard Plavetich, Laguna Beach, CA (US); John Cupit, Olivehain, CA (US)

(73) Assignee: Nissan Design America, Inc., San Diego, CA (US)

( * ) Notice: Subject to any disclaimer, the term of this patent is extended or adjusted under 35 U.S.C. 154(b) by 364 days.

(21) Appl. No.: 11/322,779

(22) Filed: Dec. 30, 2005

(65) Prior Publication Data

US 2007/0151793 A1  Jul. 5, 2007

(51) Int. Cl.
*B62D 21/04* (2006.01)
(52) U.S. Cl. ........................................ 280/786; 180/311
(58) Field of Classification Search .................. 180/311; 280/781, 785, 797, 798, 800, 786; 29/897.2; 296/187.01
See application file for complete search history.

(56) References Cited

U.S. PATENT DOCUMENTS 4,457,555 A * 7/1984 Draper ..................... 296/181.4
6,857,692 B2 * 2/2005 Cardimen et al. ........... 296/204

* cited by examiner

*Primary Examiner*—Faye M. Fleming
(74) *Attorney, Agent, or Firm*—Young Basile

(57) ABSTRACT

An embodiment of a body for a vehicle includes a plurality of interconnected, formed panels including a rear suspension mounting portion, a bulkhead, a floor pan and a front suspension mounting portion. The body further includes a unitary tubular support member extending from the front suspension mounting portion to the bulkhead. At least a portion of the support member is positioned above the floor pan.

19 Claims, 5 Drawing Sheets

VEHICLE BACKBONE

TECHNICAL FIELD

The present invention relates to vehicle bodies. More specifically, the invention relates to reinforcement structures for vehicle bodies.

BACKGROUND

Bodies for many vehicles typically include numerous structural and non-structural panels joined together to form a self-supporting, unitary, structural shell known as a uni-body. The uni-body eliminates the need for having a separate structural frame extending the length of the vehicle, as is required in traditional body-on-frame construction for vehicles, such as trucks. Generally, the uni-body panels include a front end, a cowl, a floor pan, a bulkhead, a trunk, and a roof, or hard top. Many uni-body vehicles include a front structural assembly and a rear structural assembly to facilitate affixing the body to the front and rear suspensions, respectively. These structural assemblies may include tubular members perimeter welded to the panels, or may be plates or additional panels formed as webs or reinforcement portions where a suspension portion is attached.

In many uni-body vehicles, the front end includes an engine compartment that partially encloses the engine. The front end is generally strengthened by the front suspension components in a lower portion, but experiences deflection due, at least in part, to the attachment of the front suspension to upper portions, such as shock towers. Many vehicles do not include any components to structurally stiffen and strengthen the front end, especially at upper portions of the shock towers.

Uni-body construction is well suited to a vehicle having a hard-top roof structure, such as a sedan or a coupe. In such a vehicle, the roof provides a portion of the structural strength and stiffness of the uni-body that is required for joining the engine and suspension components at the front of the vehicle to the rear suspension.

In vehicles such as convertibles or roadsters, however, having a soft-top or no top, or in vehicles where a significant portion of the top is removable, the remaining portion of the uni-body must include sufficient additional structure to provide a uni-body that is strong enough and stiff enough to withstand the static and dynamic loads incident with operation of the vehicle. In such vehicles, the number and material gage of the individual components of the uni-body must often be more than doubled in some areas to achieve the required structural strength and stiffness of the uni-body. Adding these components, and increasing the material thickness, undesirably increases the cost, weight and complexity of the uni-body of the vehicle, and can require that the assembly procedures on an assembly line be altered considerably for accommodating vehicles without hard-top roof structures.

Current body production methods may benefit from an improved architecture and method for producing a uni-body, providing the additional structural strength and stiffness required in certain types of vehicles, such as convertibles, roadsters, and vehicles where a significant portion of an otherwise hard-top roof are removable, that can be assembled on a conventional uni-body assembly line with common manufacturing techniques.

SUMMARY

An embodiment of a body for a vehicle includes a plurality of interconnected, formed panels including a rear suspension mounting portion, a bulkhead, a floor pan and a front suspension mounting portion. The body further includes a unitary tubular support member extending from the front suspension mounting portion to the bulkhead. At least a portion of the support member is positioned above the floor pan.

An embodiment of a vehicle includes a uni-body having a front portion, a cowl, a floor pan, and a bulkhead. The floor pan extends between the cowl and the bulkhead. The cowl is interposed between the front portion and the floor pan. The vehicle also includes a front suspension coupled to the front portion, a rear suspension including a rear cross member coupled to the body and a support member extending at least between the bulkhead and the front portion of the body.

An embodiment of a method of manufacturing a vehicle includes forming a vehicle body having a cowl, a front suspension attachment portion, a floor pan, and a rear suspension mounting portion. The method also includes attaching a unitary tubular member to the cowl, attaching the tubular member to the front suspension attachment portion and attaching the tubular member to the floor pan. At least a portion of the support member is positioned above the floor pan.

DETAILED DESCRIPTION

Figure 1:
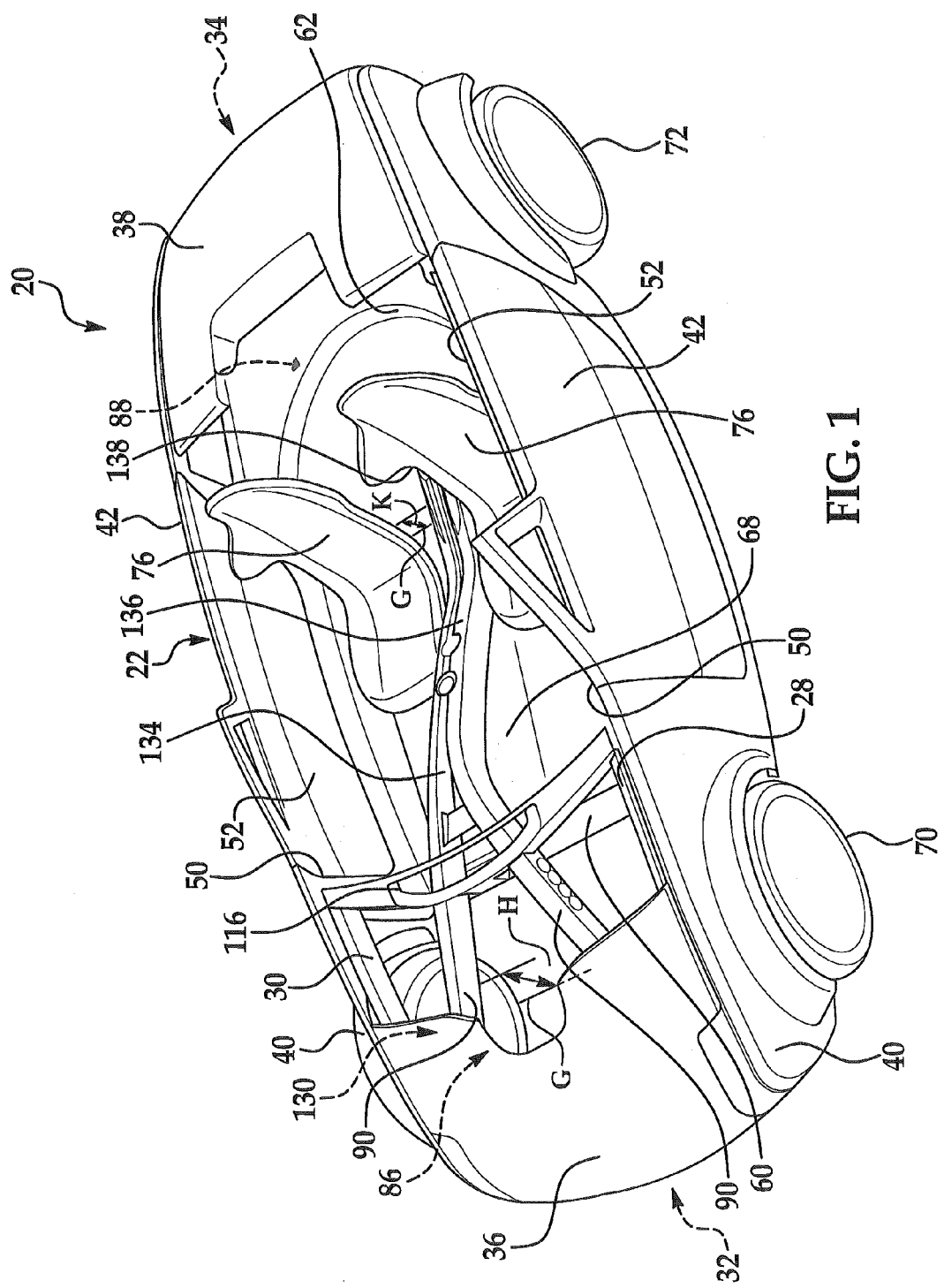
FIG. 1 is a perspective view of an embodiment of a vehicle backbone with a vehicle illustrated in part for clarity.

FIG. 1 illustrates an embodiment of a vehicle 20. The vehicle 20 includes a body 22 having a first lateral side 28, a second lateral side 30, a front end 32, and a rear end 34. The vehicle 20 further includes various body panels such as a hood 36, a trunk lid 38, fenders 40 and door skins 42. Both the first lateral side 28 and the second lateral side 30 have a doorway 50 with a door 52 attached thereto. Preferably, the body 22 is formed of welded sheet steel, although other materials may be used. The body 22 also includes a cowl 60, a trunk 62, a floor pan 64, and a bulkhead 66. The floor plan 64 has a central tunnel 68 formed therein. In the embodiment illustrated, the floor pan 64 and the central tunnel 68 extend between the cowl 60 and the bulkhead 66. The vehicle 20 further includes a pair of front wheels 70, a pair of rear wheels 72, and a pair of seats 76.

The vehicle 20 also includes a front suspension 86 attached to the front end 32 of body 22, a rear suspension 88 attached to the rear end 34 of the body 22, and a pair of support members 90 extending between the front suspension 86 and the bulkhead 66. To permit the support members 90 to extend between the front suspension 86 and the bulkhead 66, the cowl 60 includes cowl apertures 96 (FIG. 3) with support members 90 interposed therethrough.

As illustrated, each support member 90 is attached to the front end 32 of the body 22 at a minimal height H above a ground level G, and each support member 90 is attached to the central tunnel 68 of the body 22 at a maximum height K above the ground level G, as discussed in greater detail below. Generally, the ground level G is a reference location defining a plane that intersects the lowermost portions (not numbered) of the wheels 70, 72.

Figure 2:
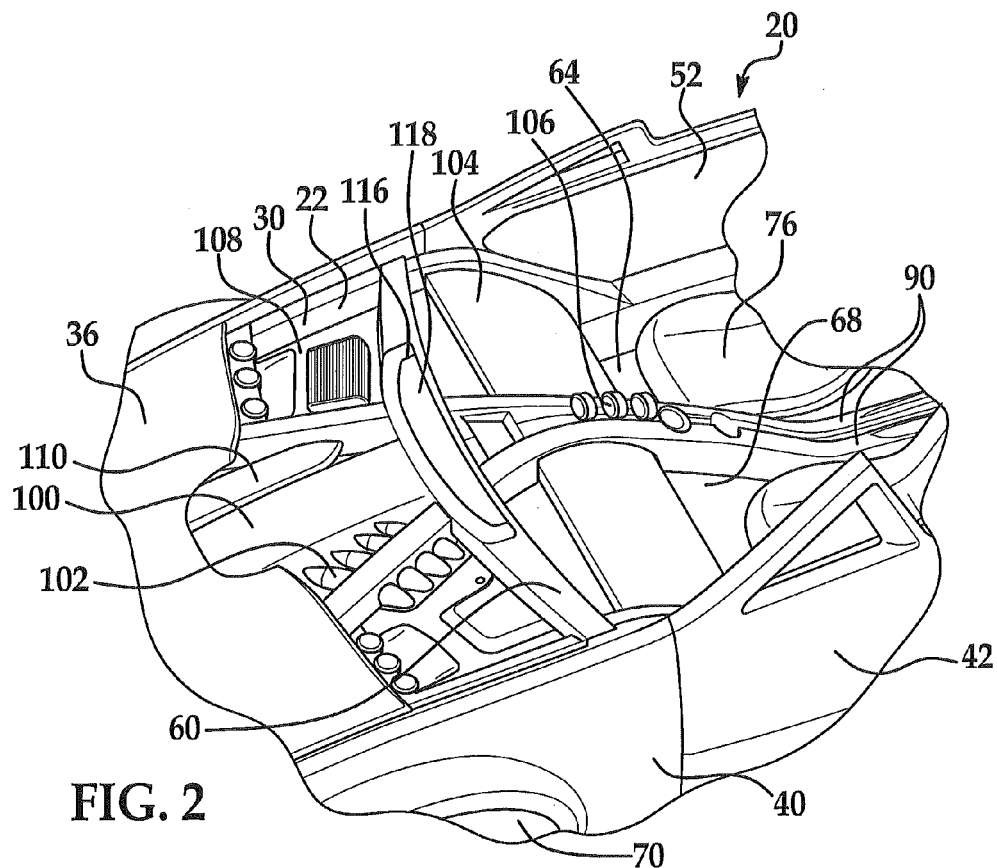
FIG. 2 is an enlarged partial view similar to FIG. 1, with fewer items removed for clarity.
Figure 3:
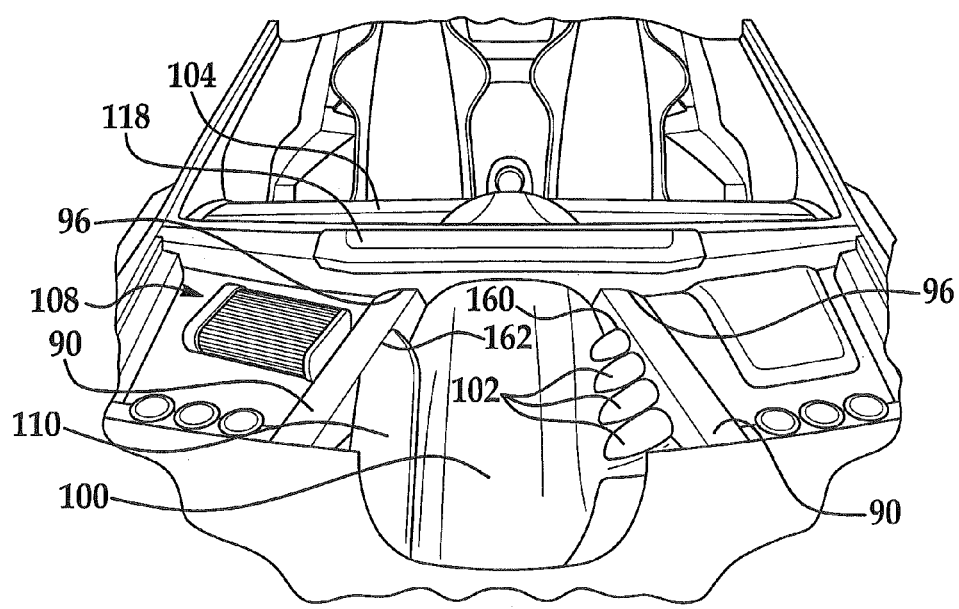
FIG. 3 is an enlarged partial view of the vehicle of FIG. 1 from above and front.

FIGS. 2-5 illustrate embodiments of portions of the vehicle 20, some represented schematically, for descriptive purposes. FIGS. 2 and 3 illustrate the vehicle 20 to further include an engine 100 having exhaust pipes 102, a dash 104, instrumentation 106 (FIG. 2 only), an air cleaner 108, and an air intake 110. With reference to FIGS. 1-3, cowl 60 includes a cowl opening 116 having a cowl covering 118.

Figure 4:
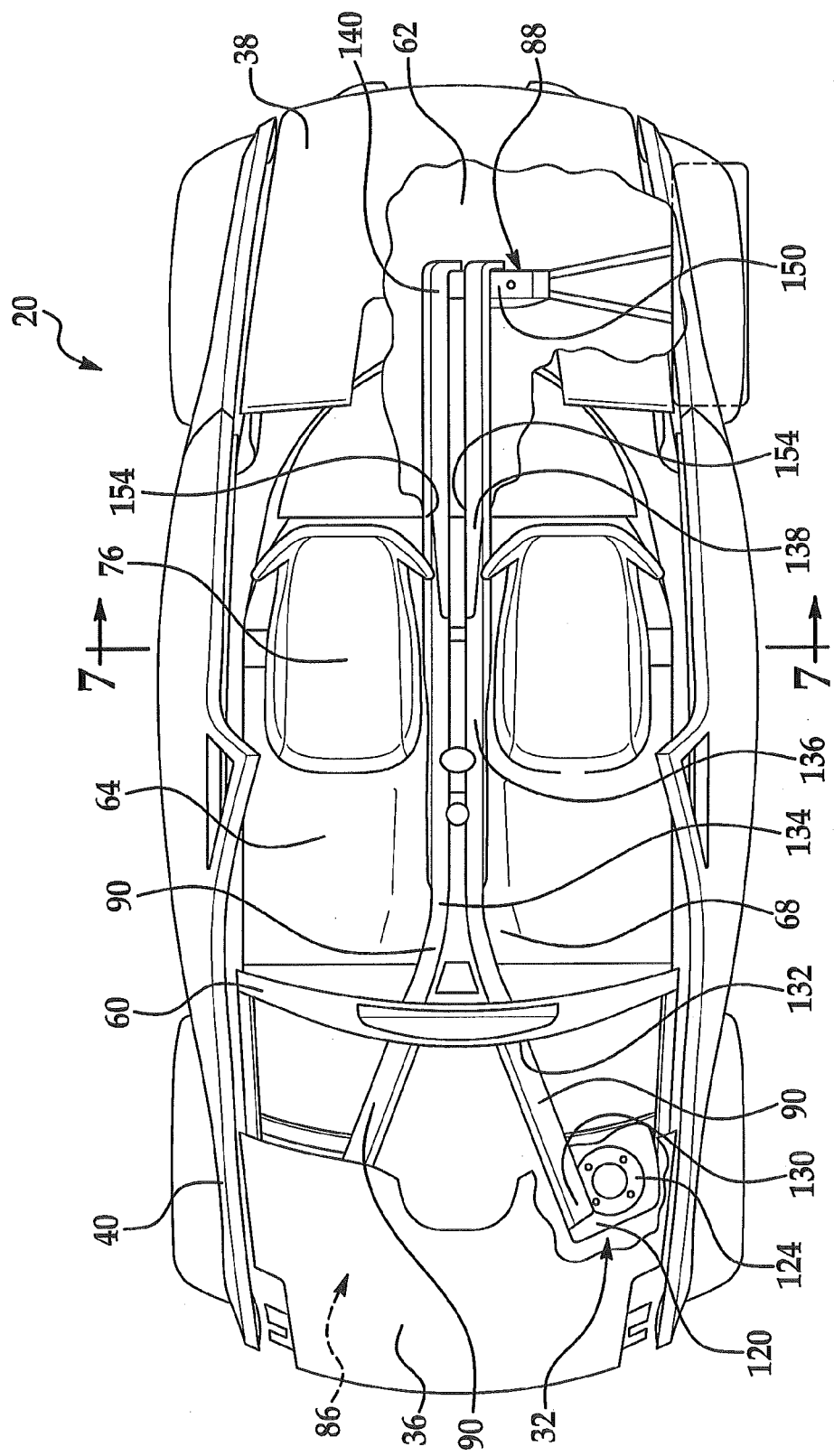
FIG. 4 is a top view of another embodiment of a vehicle backbone with a vehicle illustrated with partial cut-outs and items removed for clarity.
Figure 6:
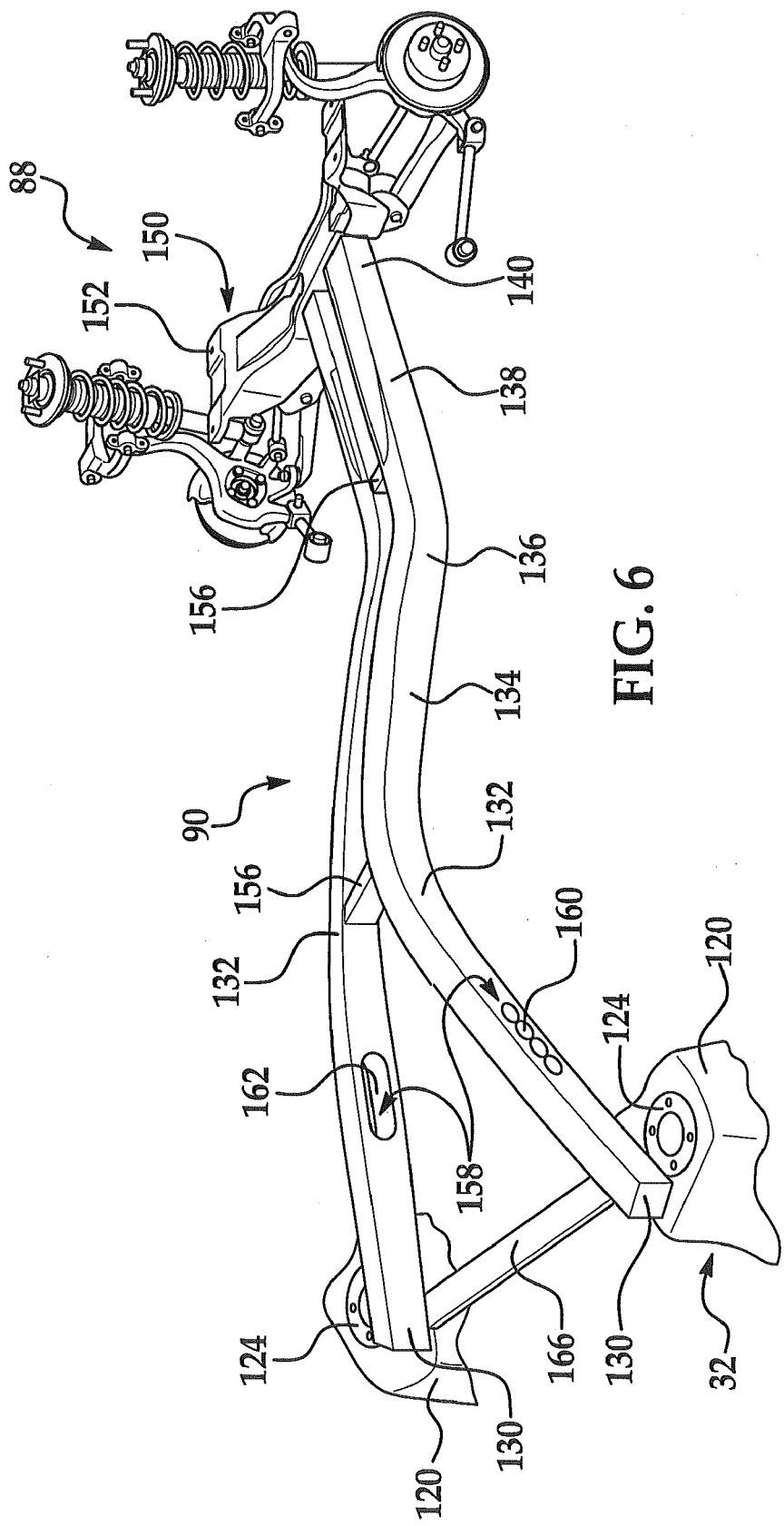
FIG. 6 is a perspective view of another embodiment of a vehicle backbone.
Figure 5:
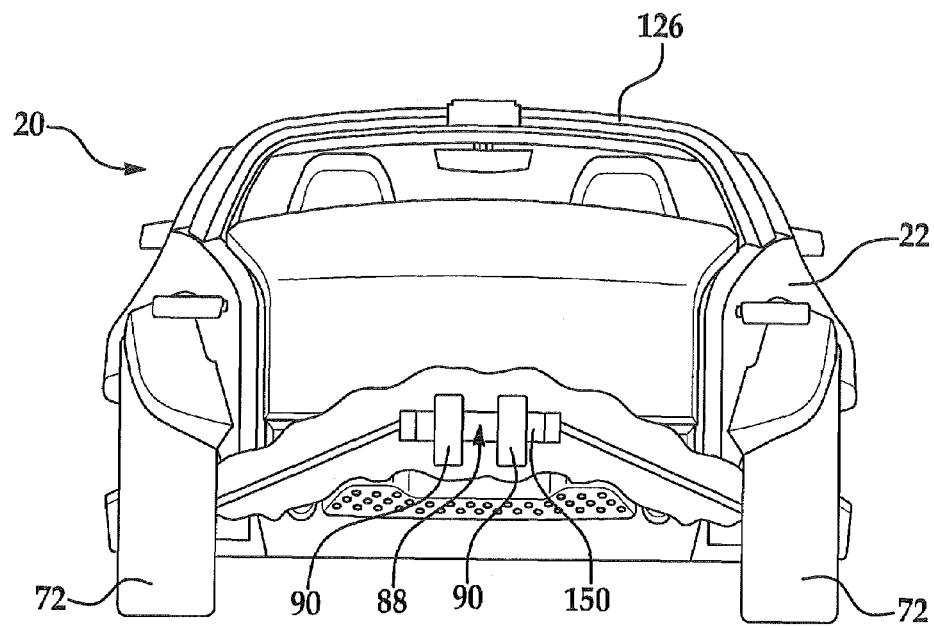
FIG. 5 is a rear view the vehicle of FIG. 4, illustrated with a partial cut-out for clarity.

With specific reference to FIGS. 4-6, the front end 32 of the body 22 includes a first shock tower 120 and a second shock tower 122. Both the first shock tower 120 and the second shock tower 122 are bolted, or otherwise connected, to a reinforcement plate 124. Generally, this bolted connection will include a connection to coil springs (not illustrated) and struts (not illustrated) of the front suspension 86. Both the first shock tower 120 and the second shock tower 122 are a portion of the formed panels of the front end 32. As best illustrated in FIG. 5, the vehicle 20 may also include a hard top 126.

FIG. 6 illustrates the rear suspension 88, the support members 90, and the shock towers 120. Each support member 90 includes a front suspension mounting portion 130, a cowl mounting portion 132, a curved cowl-tunnel portion 134, a central tunnel mounting portion 136, and a bulkhead mounting portion 138. Each support member 90 may also include a rear suspension mounting portion 140, as best seen in the embodiments of FIGS. 4-6. The rear suspension 88 includes a cross member 150 having a trunk mounting portion 152 (FIG. 6).

Each support member 90 is attached to one reinforcement plate 124 at the front suspension mounting portion 130 by welding or other suitable process. Preferably, each support member 90 is a unitary tubular member that extends between the bulkhead 66 and one of the reinforcement plates 124. In another embodiment, support member 90 is a unitary tubular member that extends between the cross member 150 and one of the reinforcement plates 124. The unitary tubular construction permits the support members 90 to reinforce the body 22 by increasing at least torsional stiffness. Preferably, the support members 90 are perimeter welded to the bulkhead 66, although stiffener plates (not shown) may be used if desired.

Figure 7:
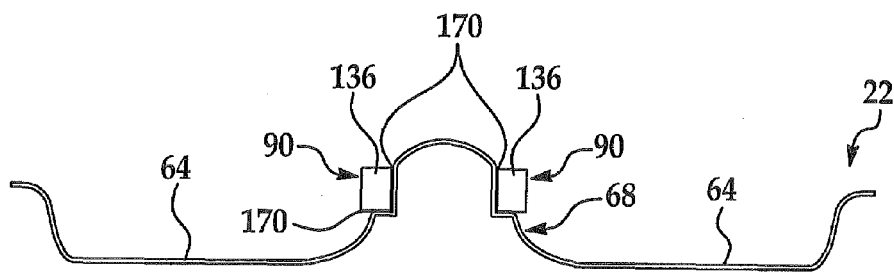
FIG. 7 is a partial view taken along line 7-7 of FIG. 4, illustrated without section graphics.

FIG. 7 best illustrates the interconnection of the support members 90 and the floor pan 64. The central tunnel 68 of the floor pan 64 may be formed as illustrated, to mate with support members 90 that are generally rectangular in section, or the support members 90 may be formed to mate with the contours of the central tunnel 68, or other portions of the floor pan 64. Preferably, at least a portion of the central tunnel 68 is interposed between the support members 90.

In the embodiments illustrated in FIGS. 4-6, each support member 90 extends between the rear cross member 150 and one of the reinforcement plates 124. To permit the support members 90 to extend between the front suspension 86 and the rear cross member 150, the bulkhead 66 includes bulkhead apertures 154 (FIG. 4) with support members 90 interposed therethrough.

FIG. 6 further illustrates another embodiment of the support members 90 to include stiffeners 156 extending therebetween and apertures 158 formed therein. Preferably, apertures 158 include exhaust pipe apertures 160 and an intake aperture 162. A cross rail 166 interconnects the front suspension mounting portions 130. Exemplary embodiments of the support members 90 may or may not have one or more of the rear suspension mounting portion 140, stiffeners 156, or the cross rail 166.

Each support member 90 is preferably a unitary member, hydro-formed of tubular steel or aluminum to provide improved structural stiffness and strength of the body 22. While the support members 90 are described as formed of a metal, the support members 90 may also be carbon fiber, any combination of metals and composites, or other known structural materials. Support members 90 that are constructed of a metal may be perimeter welded to the body 22 at the cowl 60, central tunnel 68, and the bulkhead 66 to increase body stiffness. Preferably, the support members 90 and the central tunnel 68 are coupled along the length of the central tunnel mounting portion 136 via a plurality of perimeter welds 170 to provide an attachment between the front suspension 86 and the rear suspension 88. Thus provided, the perimeter welds 170 extend longitudinally along the central tunnel mounting portion 136 to further increase the stiffness of body 22 between the floor pan 64 and the front suspension 86, thereby increasing the stiffness between the front suspension 86 and the rear suspension 88.

Additionally, the support members 90 may increase resistance to a frontal impact by providing additional front to rear strength as energy may be transferred through both the body 22 and the support members 90. As best illustrated in FIG. 1, the support members 90 are connected to the vehicle 20 at a higher location toward the front end 32 of the body 22 than at the bulkhead 66, toward the rear end 34 of the body 22, since the height H is greater than the height K. In this manner, the body 22 is structurally stiffened, both torsionally and longitudinally, due to the generally triangular form of the connection between the cowl 60, the support members 90, and the bulkhead 66.

Additionally, extending the structural supports to the shock towers 120, 122 and to the rear suspension 88 may increase the structural stiffness of the body 22 further. Preferably, the support members 90 extend from a location positioned above the front suspension 86 to a location that is adjacent the rear suspension 88 and at a height of about a mid range of the rear suspension 88.

As best seen in FIG. 6, the cross rail 166 and the portions of the support members 90 between and including the front suspension mounting portions 130 and the cowl mounting portions 132 are coupled in a generally triangular form that may increase the stiffness and strength of the front end 32. Preferably, the support members 90 are connected by a stiffener 156 near the cowl 60, as illustrated in FIG. 6, and by perimeter welds to the cowl 60. The rear suspension 88, although illustrated as having a cross member 150, need not have a cross member.

As illustrated in FIGS. 4-6, the support members 90 may extend between the front suspension 86 and the rear suspension 88. The rear suspension mounting portion 140 may be perimeter welded to the cross member 150, as illustrated in the embodiment of FIG. 6, or may be curved over the cross member 150 and connected to both the trunk 62 and the cross member 150 by welding and/or bolting, as illustrated in the embodiment of FIG. 5, as desired.

While the support members 90 are illustrated with a generally rectangular cross section (FIG. 7), support members 90 may have variable sections taken normal to the axis of the support members 90 as the support members 90 contour with the body 22 and other components of the vehicle 20, such as the dash 104 and instrumentation 106. Also, the dimensions normal to the axis and thickness of the support members 90 along the axial length thereof need not be consistent, but may be tuned for desired torsional strength, buckling strength, stiffness, torsional resistance, or for aesthetics. Additionally, the support members 90 may include apertures, such as the exhaust pipe apertures 160 to allow the exhaust pipes 102 to pass therethrough, or the intake apertures 162 to allow the air intake 110 to pass therethrough, as desired. Furthermore, the support members 90 may have other operable components, such as wiring, heating ducts, or fluid lines interposed therein.

The support members 90 may be covered in portions with materials, such as spiral wound carbon fiber composite, for strength, aesthetics, or to dampen vibrations and deaden sound that may be transmitted from the front suspension 86 or the rear suspension 88 to the occupants of the seats 76. Furthermore, the support members 90 may have materials interposed therein for strengthening, sound deadening, vibration dampening, insulation, or other purposes.

Collectively, the central tunnel 68, the bulkhead 66, and the rear suspension 88 provide a rear mounting location for the support members 90. As illustrated, the support members 90 are attached to a rear suspension mounting portion, such as the central tunnel 68, the bulkhead 66, or the trunk 62. While the front end 32 and the cowl 60 are both preferably connected to the support members 90, either the front end 32 and the cowl 60 may provide a front mounting location for the support members 90.

In the embodiment illustrated, the front end 32, the rear end 34, the cowl 60, the floor pan 64, the bulkhead 66, and the trunk 62 are sections of sheet steel that are formed, preferably by stamping. Additionally, the hood 36, the trunk lid 38, the fenders 40 and the door skins 42 may also be formed of sheet steel, or other suitable materials such as composites and aluminum. As described herein, the body 22 is preferably a uni-body with a plurality of welded, interconnected, formed panels of sheet steel. While the support members 90 have been described with a uni-body vehicle, other embodiments may also be used with a body-on-frame construction vehicle.

Preferably, the cowl 60 extends vertically from the windshield (not numbered) to the floor pan 64, and separates a passenger compartment (not numbered) from an engine compartment (not numbered) in a front engine vehicle, such as the vehicle 20. Accordingly, the support members 90 extend through cowl apertures (FIG. 3). Even more preferably, the sheet steel portions of the cowl 60 do not contact the windshield, but the cowl 60 includes suitable materials that form an interface (not numbered) between any steel and the windshield. Also, the bulkhead 66 extends generally vertically between the floor pan 64 and the trunk 62, providing a surface for the support members 90 to attach to and/or extend through.

As described in the embodiments herein, the support members 90 are symmetrically positioned longitudinally within the vehicle 20 to support the body 22. Specifically, the interconnection of the support members 90 with the shock towers 120, 122 and the central tunnel 68 provide increased torsional stiffness and strength for the vehicle 20, especially when the vehicle 20 does not have a hard top 126. Additionally, the support members 90 increase stiffness and strength of the body 22 when the body 22 includes a hard top 126, and may reduce the amount of material required to produce the body 22 while providing a desired amount of stiffness and strength.

Existing assembly lines (not shown) may be configured to produce a vehicle, such as the vehicle 20, with and without support members 90, thereby providing greater flexibility in manufacture without the need for body-specific assembly. Additionally, the stiffeners 156 and cross rail 166 may or may not be included during manufacture, as desired. Preferably, a vehicle, such as the vehicle 20, may be produced in a standard version, without the support members 90, and in a tuned version where the support members 90, the stiffeners 156, and the cross rail 166 are included, as desired, for stiffening and strengthening a body 22 without a hardtop, for stiffening and/or strengthening a body 22 for performance applications, or other reasons.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A body for a vehicle comprising:
   a plurality of interconnected, formed panels including:
   a rear suspension mounting portion;
   a bulkhead;
   a floor pan;
   a front suspension mounting portion; and
   a unitary tubular support member extending from the front suspension mounting portion to the bulkhead, wherein at least a portion of the support member is positioned above the floor pan; and
   wherein a height above a vertical reference location of the support member at a front mounting location is greater than a height above the vertical reference location of the support member at a rear mounting location.

2. The body of claim 1, wherein the support member is directly connected to the rear suspension mounting portion.

3. The body of claim 1, wherein the support member is coupled directly to the bulkhead, a cowl, and a central tunnel of the body.

4. The body of claim 1, wherein the panels form a uni-body without a frame extending under the body from the front suspension mounting portion to the rear suspension mounting portion, and wherein the support member is above at least portions of the floor pan between the front suspension mounting portion and the bulkhead.

5. The body of claim 1, wherein the panels include a hard top.

6. A uni-body for a vehicle comprising:
   a floor pan;
   a front suspension mounting portion; and
   a support member extending from the front suspension mounting portion;
   wherein at least a length of the support member having a continuous perimeter is vertically spaced from the floor pan,
   wherein the cowl defines a forward end of a passenger compartment and the bulkhead defines a rearward end of the passenger compartment.

7. The body of claim 6, wherein the floor pan includes a central tunnel coupled to the support member, and all portions of the support member are above portions of the floor pan.

8. A method of manufacturing a vehicle, comprising:
forming a vehicle body having a cowl, a front suspension attachment portion, a floor pan, and a rear suspension mounting portion;
attaching a unitary tubular member to the cowl;
attaching the tubular member to the front suspension attachment portion;
attaching the tubular member to the floor pan, wherein at least a portion of the support member is positioned above the floor pan; and
interposing the tubular member within a cowl aperture.

9. The method of claim 8, further comprising:
attaching a second tubular member to the front suspension attachment portion; and
attaching the second tubular member to the floor pan, such that the tubular member and the second tubular member are generally symmetrically positioned longitudinally within the vehicle.

10. The method of claim 9, further comprising attaching the tubular member to the rear suspension mounting portion.

11. The method of claim 8, further comprising attaching the tubular member to a bulkhead, wherein the floor pan is interposed between the cowl and the bulkhead.

12. The method of claim 8, further comprising:
attaching the tubular member to a cross rail; and attaching the cross rail directly to a second tubular member.

13. The body of claim 1, further comprising a cowl, and wherein the cowl defines a forward end of a passenger compartment and the bulkhead defines a rearward end of the passenger compartment.

14. The body of claim 1, wherein at least a length of the support member having a continuous perimeter is vertically spaced from the floor pan.

15. The body of claim 6, wherein the support member is a generally tubular, unitary member.

16. The body of claim 6, wherein the support member is configured to extend longitudinally between a driver seat and a passenger seat in the passenger compartment.

17. The body of claim 16, wherein the support member includes a first tubular member and a second tubular member; and
wherein the first tubular member and second tubular member are obliquely angled forward of the cowl.

18. The body of claim 6, wherein the support member includes a first tubular member and a second tubular member; and
wherein the first and second tubular members are obliquely angled adjacent the front suspension mounting portion and parallel adjacent the rear suspension mounting portion.

19. The body of claim 6, further comprising a front shock tower supporting a front suspension coupled to the front suspension mounting portion; and
wherein the support member extends rearward from above the front suspension.

\* \* \* \* \*